United States Patent [19]

Karlsson

[11] Patent Number: 5,062,873

[45] Date of Patent: Nov. 5, 1991

[54] DEVICE AT A FILTER HOSE

[76] Inventor: Roger S. Karlsson, Södra Ingelsträde, 263 91 Höganäs, Sweden

[21] Appl. No.: 520,049

[22] Filed: May 7, 1990

[30] Foreign Application Priority Data

May 12, 1989 [SE] Sweden .................................. 8901704

[51] Int. Cl.⁵ .............................................. B01D 46/04
[52] U.S. Cl. .................................... 55/302; 55/341.1; 55/379
[58] Field of Search ....................... 55/302, 303, 341.1, 55/378, 379

[56] References Cited

U.S. PATENT DOCUMENTS

| | | | |
|---|---|---|---|
| 3,377,783 | 4/1968 | Young ................................ 55/379 X |
| 3,798,878 | 3/1974 | Pausch ............................ 55/341.1 X |
| 3,830,043 | 8/1974 | Nielsen et al. ........................ 55/378 |
| 3,876,402 | 4/1975 | Bundy et al. ........................ 55/341.1 |
| 3,891,418 | 6/1975 | Burger et al. .................... 55/341.1 X |
| 4,105,421 | 8/1978 | Rheinfrank, Jr. et al. ............ 55/379 |
| 4,138,234 | 2/1979 | Kubesa .............................. 55/379 X |
| 4,149,863 | 4/1979 | Ballard ................................ 55/379 |
| 4,220,459 | 9/1980 | Hammond et al. ................. 55/379 X |
| 4,251,244 | 2/1981 | Evenstad ........................... 55/379 X |
| 4,253,856 | 3/1981 | Paucha .............................. 55/379 X |
| 4,256,473 | 3/1981 | De Martino ........................ 55/379 |
| 4,266,954 | 5/1981 | Oare et al. ........................ 55/379 X |
| 4,272,263 | 6/1981 | Hancock ............................ 55/379 X |
| 4,276,069 | 6/1981 | Miller ................................. 55/379 |
| 4,278,454 | 7/1981 | Nemesi ............................. 55/379 X |
| 4,300,927 | 11/1981 | Day ................................... 55/378 |
| 4,312,648 | 1/1982 | Day ................................... 55/378 |
| 4,648,889 | 3/1987 | Jensen ............................ 55/378 X |

FOREIGN PATENT DOCUMENTS

| | | | |
|---|---|---|---|
| 2625916 | 7/1989 | France ................................ 55/379 |
| 2050199 | 7/1981 | United Kingdom . |
| 2159435 | 12/1985 | United Kingdom . |

*Primary Examiner*—Robert Spitzer
*Attorney, Agent, or Firm*—Tarolli, Sundheim & Covell

[57] ABSTRACT

The present invention relates to a device at a filter hose, forming part of a hose filter, whereby contaminated gases (7) are brought to flow into the filter hose (6) for depositing contaminants (9) on the outer side of the filter hose (6), whereby the gases are brought to flow out of the filter hose (6) to a clean-gas zone (11) through a sleeve (14), whereby at least one compressed-air nozzle (17) is provided in the clean-gas zone (11) at a distance from the sleeve (14) and adapted to guide a blow-like flow (18) of compressed air through the sleeve (14) into the filter hose (6) for momentarily expanding the hose and thereby loosen the contaminants (9) deposited on the outer side of the filter hose (6), and whereby the sleeve (14) has an end portion (14a) defining a compressed-air discharge zone (24) through which the compressed air flows from the sleeve (14) into the filter hose (6). In order to ensure that no unfavorable spaces are provided between the outer side of the sleeve (14) and the filter hose (6), the filter hose (6) engages and/or is connected to the end portion (14a) of the sleeve (14).

8 Claims, 5 Drawing Sheets

FIG. 2
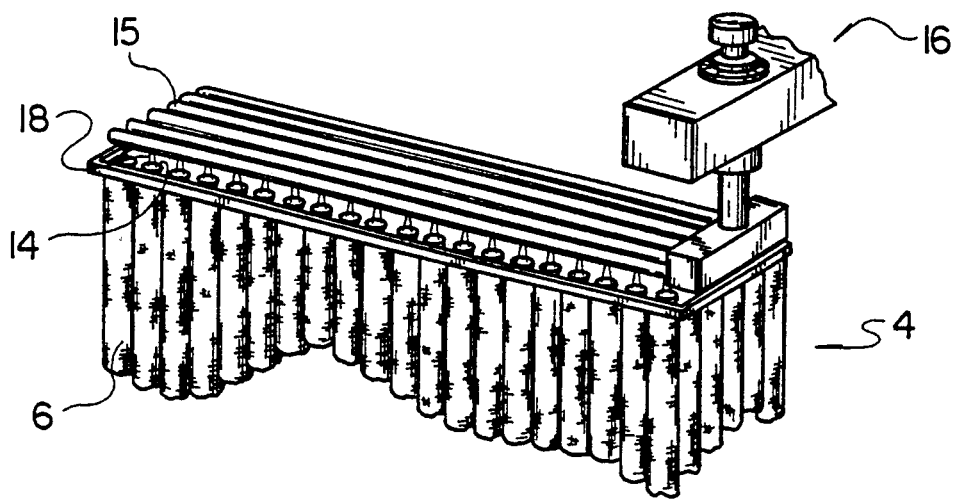
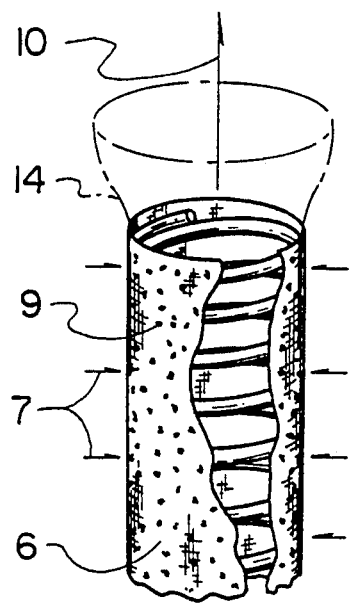
FIG. 3
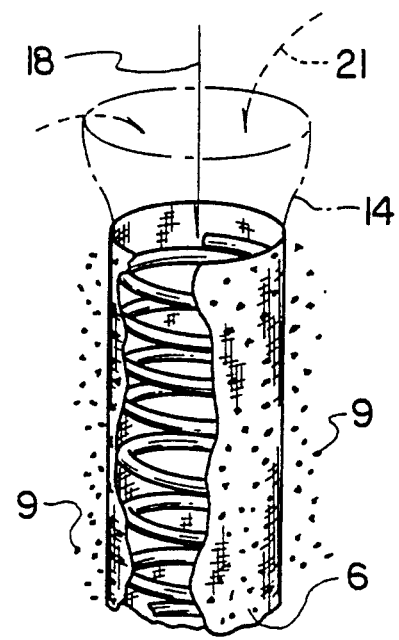
FIG. 4

DEVICE AT A FILTER HOSE

The present invention relates to a device at a filter hose, forming part of a hose filter, whereby contaminated gases are brought to flow into the filter hose for depositing contaminants on the outer side of the filter hose, whereby the gases are brought to flow out of the filter hose to a clean-gas zone through a sleeve, whereby at least one compressed-air nozzle is provided in the clean-gas zone at a distance from the sleeve and adapted to guide a blow-like flow of compressed air through the sleeve into the filter hose for momentarily expanding said hose and thereby loosen the contaminants deposited on the outer side of the filter hose, and whereby the sleeve has an end portion defining a compressed-air discharge zone through which the compressed air flows from the sleeve into the filter hose.

At the device of GB 2 159 435, the filter hose does not run as an extension of the compressed-air discharge zone of the sleeve, but extends instead along the major part of the sleeve in such a way that a longish space is defined between the sleeve and the filter hose. In this space, the blow of compressed air generates a momentary negative pressure instead of the positive pressure generated in the other spaces of the filter hose. Due to the generation of a negative pressure in said space, the contaminating particles deposited outside said space will not loosen but instead cling to and finally penetrate the wall of the hose and thus, reach the clean-gas zone.

The object of the present invention is to eliminate this problem and provide a device wherein the filter hose does not define disadvantageous spaces around the sleeve. To accomplish this, the device has been given the characterizing features of subsequent claim 1.

While the filter hose engages and/or is connected to the end portion of the sleeve, it is ensured that unfavourable spaces around the sleeve do not exist.

The invention will be further described below with references to the accompanying drawings, in which FIG. 1 is a perspective view of a hose filter in which sleeves according to the invention are used;

FIG. 2 is a perspective view of a filter cassette forming part of the hose filter and provided with sleeves according to the invention;

FIG. 3 illustrates schematically a filter hose forming part of the filter cassette while filtering is carried out;

FIG. 4 illustrates schematically the filter hose of FIG. 3 during cleaning;

Figure 1:
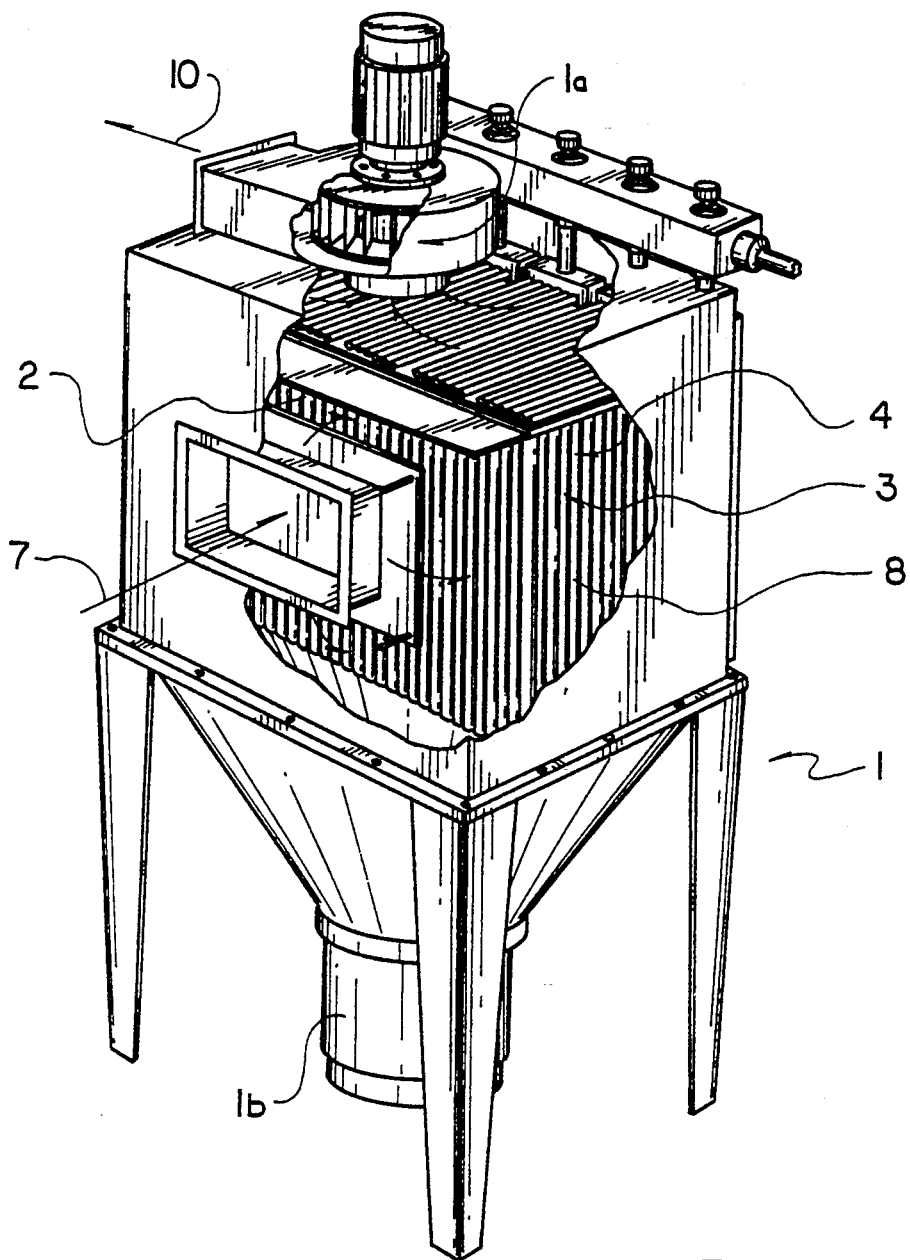

The filter device 1 illustrated in FIG. 1 includes a space 2 for hose filters 3, in this embodiment in the shape of a number of filter cassettes 4. Each filter cassette 4 has anchoring portions 5, from which filter hoses 6 depend. Contaminated gas 7, normally air mingled with dust, is brought to flow into the filter hoses 6 for depositing contaminants 9 on the outer sides thereof (see FIG. 3) and the gas 10 thus cleaned flows into clean-gas zone 11 positioned above said anchoring portions 5, via the upper end portions of the filter hoses 6. The cleaned gas 10 is thereafter fed out of the filter device 1 through a fan 1a provided thereon.

For mounting the filter hoses 6, the anchoring portions 5 of the filter cassette 4 has apertures 12 and the mounting occurs by clamping free end portions 13 of the filter hoses 6 by means of sleeves 14 which are inserted into the apertures 12. The sleeves 14 are sized such that said end portions 13 are clamped between the outer sides thereof and the edges of the apertures 12. The sleeves 14 are also adapted to keep the end portions 13 of the filter hoses 6 open and they carry a helical separating thread 6a.

A number of pipes 15, forming part of a compressed-air system 16, are provided in the clean-gas zone 11. These pipes 15 have a compressed-air nozzle 17 for each sleeve 14 and each nozzle 17 can be a hole, nipple or similar disposed at a distance from its sleeve 14, directed towards said sleeve 14 and centered therewith. The compressed-air system 16 is adapted to a generate blow-like flows 18 of compressed air, which by said nozzles 17 are directed into the sleeves 14 and through these into the filter hoses 6. These flows of compressed air momentarily expand the filter hoses 5 such that they are cleaned by throwing away the contaminants 9 deposited thereon (see FIG. 4). After each blow of compressed air, the filter hoses 6 contract to their original shape. The loosened contaminants 9 fall down into a collecting container 1b, from which they are later removed.

Figure 6:
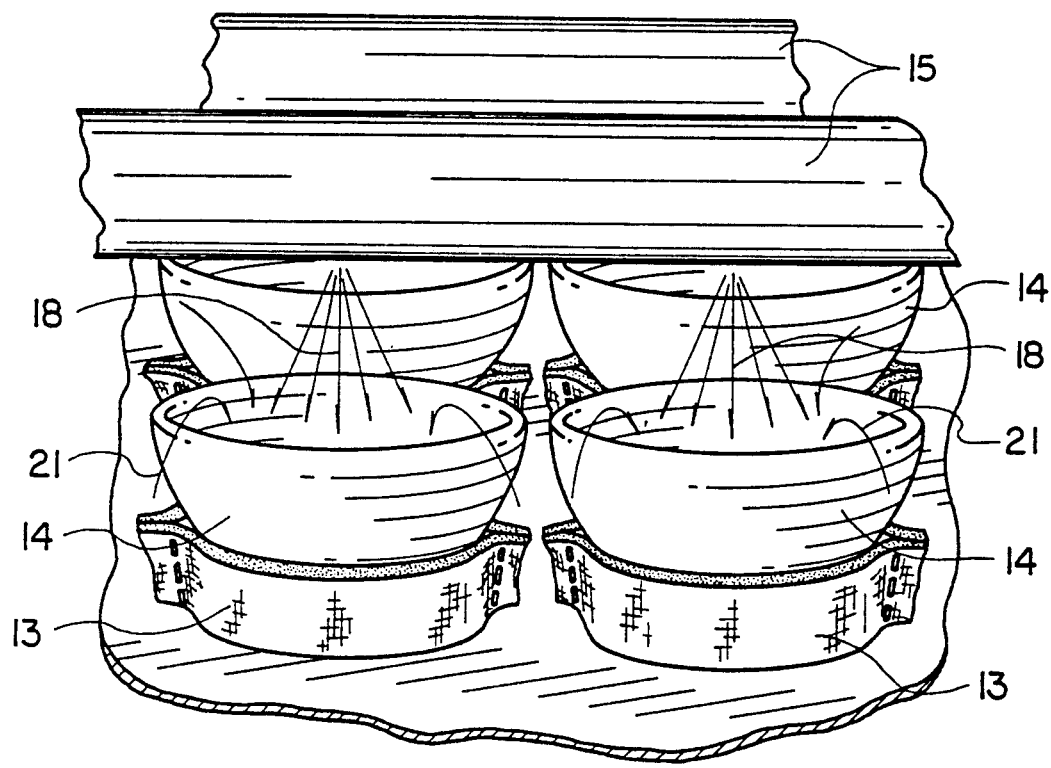
FIG. 6 illustrates schematically how air flows into a sleeve according to FIG. 5.

In order to improve the cleaning effect at a predetermined comsumption of compressed air or to reduce the comsumption for a certain cleaning effect, the sleeves 14 are provided with a compressed-air receiving zone 19, which from a compressed-air receiving opening 20 tapers in the direction of flow TR of the compressed air through the sleeve 14 towards the filter hose 6. By means of this design of the sleeve 14, said sleeve can easily "catch" the streams 18 of compressed air, and the capacity of said streams or flows 18 to "co-eject" the air 21 from the clean-gas zone 11 and into the sleeve 14 (see FIG. 6) is improved. This sleeve 14 also includes a compressed-air constriction zone 22 with a substantially smaller through-flow area than the compressed-air receiving opening 20 and which is positioned between the compressed-air receiving zone 19 and a compressed-air discharge opening 23, through which the compressed air flows from the sleeve 14 to the filter hose 6. In the compressed-air constriction zone 22, the speed of the flow 18 of compressed air is increased, whereby the filter hose 6 is subjected to an effective, blow-like expansion along its entire length.

The sleeve 14 is preferably circular and the diameter D1 of the compressed-air receiving opening 20 is preferably at least 60% larger, preferably twice the diameter D2 of the narrowest portion of the compressed-air constriction zone 22. Thus, the compressed-air receiving opening 20 of the sleeve 14 illustrated in FIG. 5 has a diameter D1 of 32 mm and the diameter D2 of the smallest portion of the compressed-air constriction zone 22 is 16 mm. The sleeve 14 shown in FIG. 7 has a diameter D1 of 32 mm and a diameter D2 of 20 mm.

Figure 5:
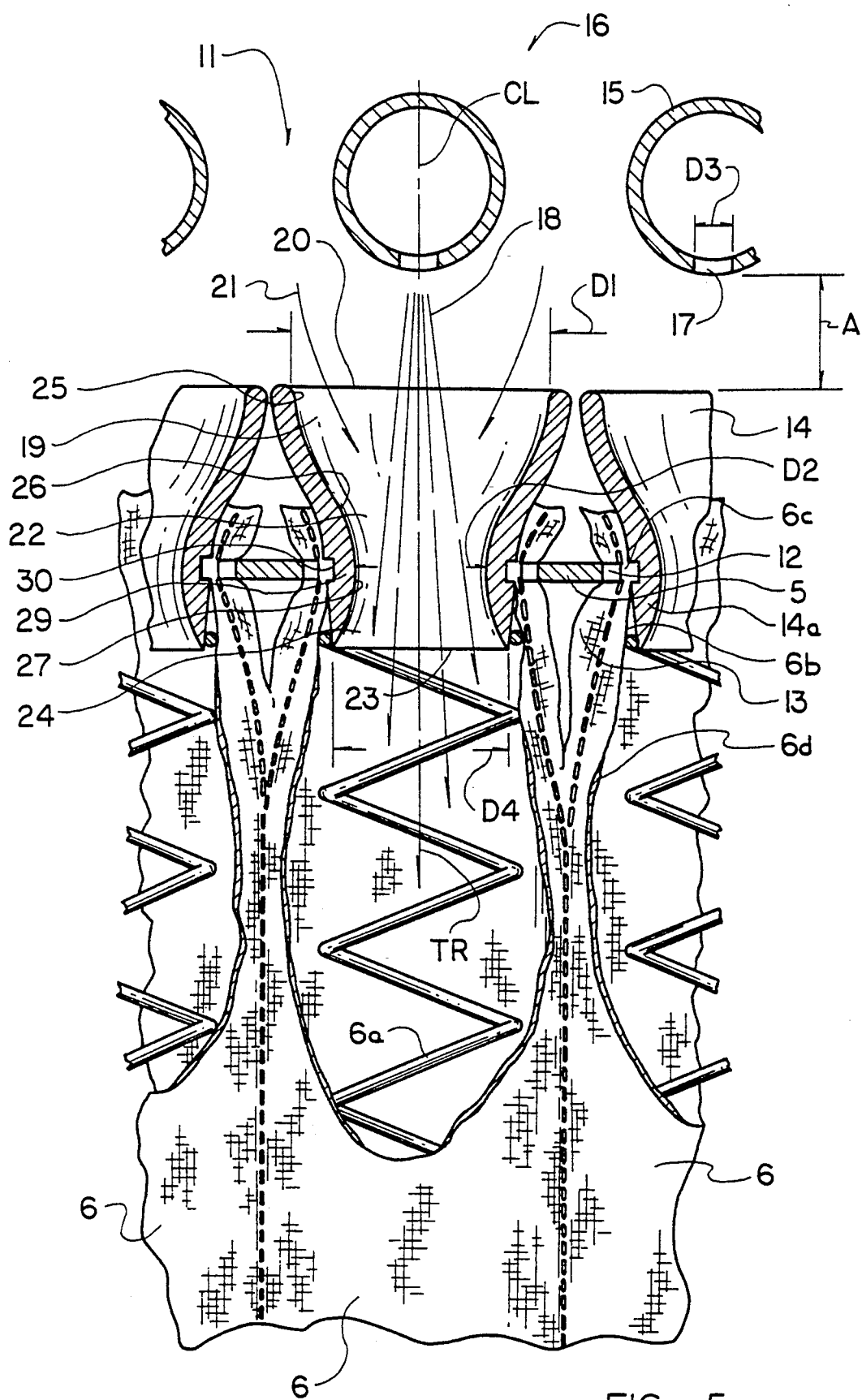
FIG. 5 is a section through some sleeves according to the invention.

The diameter D1 of the compressed-air receiving opening 20 is preferably 6–10 times larger, preferably 8 times larger than the diameter D3 of the compressed-air nozzle 17. In the embodiments shown in the drawings, the compressed-air nozzle 17 has a diameter of 4 mm and the sleeves, as stated above, a diameter D1 of the compressed-air receiving opening 20 of 32 mm. The distance A between the compressed-air receiving opening 20 and the compressed-air nozzle 17 is preferably substantially smaller than the diameter D1 of the compressed-air receiving opening 20. As an example it can be mentioned that the distance A at the embodiment of FIG. 5 is 14 mm and at the embodiment of FIG. 7, the distance is 22 mm. Furthermore, the length of the tapering compressed-air receiving zone of the sleeve 14 is preferably at least 25% of the total length of the through-flow zones of the sleeve 14.

The sleeve 14 illustrated in FIG. 5 preferably includes a compressed-air discharge zone 24, which expands, seen in the direction of flow TR of the compressed air, towards the compressed-air discharge opening 23. At the sleeve 14 according to FIG. 5, the compressed-air receiving zone 19, seen from the centre line CL of the sleeve 14, has concavely curved wall portions 25 and the compressed-air constriction zone 22, seen from the centre line CL of the sleeve 14, has convexly curved wall portions 26, whereby the wall portions 25 transfer into the wall portions 26 without interruptions. The compressed-air discharge zone 24 has, seen from the centre line CL of the sleeve 14, convexly curved wall portions 27 which without interruptions connect to the wall portions 26.

The compressed-air discharge opening 23 preferably has a diameter D4 which is at least 30% larger than the smallest diameter D2 of the compressed-air constriction zone 22, but smaller than the diameter D1 of the compressed-air receiving opening 20.

Through this design of the sleeve 14 of FIG. 5, the sleeve 14 attains an "egg-cup like shape" which thereby provides extensive advantages with regard to the flow 18 of compressed air.

In order to eliminate the risk for the occurence of spaces around the sleeve 14 within the filter hose 6, said hose 6 engages and/or is connected to the end portion 14a of the sleeve 14.

The filter hose 6 preferably includes a portion 6b which surrounds and engages the end portion 14a of the sleeve 14.

From a portion 6c clamped by means of the sleeve 14, the filter hose 6 preferably extends along the sleeve and its end portion 14a.

The portion 6d of the filter hose 6 provided closest to the end portion 14a of the sleeve 14, expands preferably in a direction from said end portion 14a, and if the compressed-air discharge zone expands, said portion 6d also expands preferably as an extension of this zone 24. The portion 6a thereby preferably connects to the end portion 14a without sharp interruptions.

Hereby, a smooth transition from the interior of the filter hose 6 to the interior of the sleeve 14 is provided, whereby the cleaned gas 10 can flow from the interior of said hose to the interior of said sleeve without generating undesired turbulence in this gas flow.

The portions of the sleeve defining the compressed-air constriction zone 22 have anchoring portions 29 through which the sleeve 14 and the filter hose 6 are secured to the anchoring portions 5. These anchoring portions 29 are provided with an annular groove 30 and the fastening is carried out such that the sleeve 14 is pressed into the aperture 12 within the end portions 13 of the filter hose 6. Since the sleeve 14 is elastic, it is hereby somewhat compressed until the groove 30 is in a position just opposite to the anchoring portions 5. Hereby, the sleeve 14 springs outwardly and clamp the end portions 13 of the filter hose 6 between said sleeve and the anchoring portions 5. Thus, the portions of the sleeve defining the compressed-air receiving zone 19 are disposed the clean-gas side of the anchoring portions 5, i.e. said portions are positioned in the clean-gas zone 11, which is advantageous since there is room therein for expanded portions of the sleeve 14.

Figure 7:
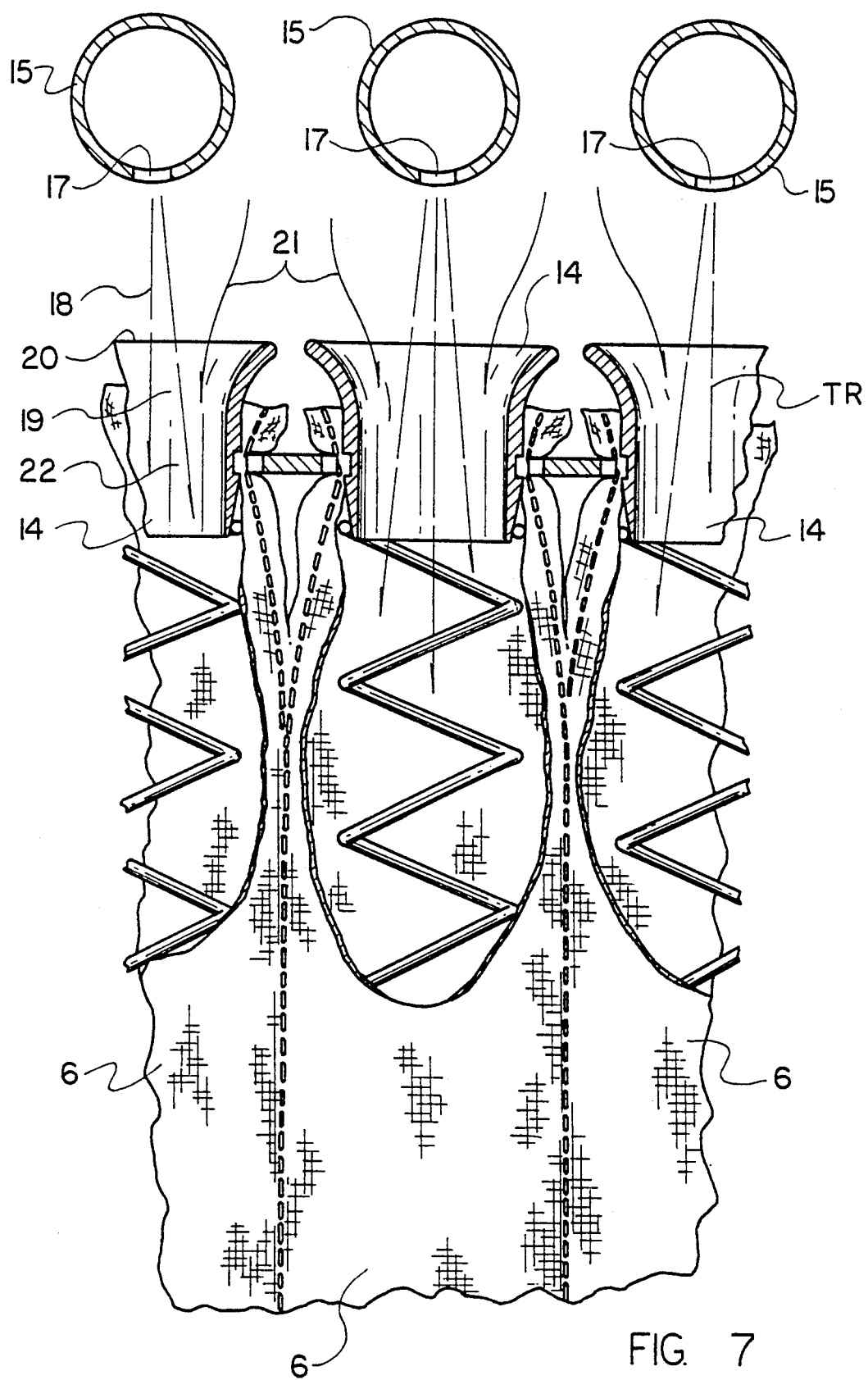
FIG. 7 finally, is a section through alternatively designed sleeves according to the invention.

The sleeve 14 illustrated is FIG. 7 has a more simple design, but still fulfils the requirements set. Thus, the compressed-air constriction zone 22 thereof is cylindrical and extends from the compressed-air receiving zone 19 to the compressed-air discharge opening 23.

Except that the sleeves described provide an advantageous flow of compressed air and co-ejection of air from the clean-gas zone 11, they also enable a turbulence-free discharge of clean gas from the filter hose 6 to the clean-gas zone 11, which is also important.

The invention is not limited to the embodiments described above and shown in the drawings, but may vary within the scope of the succeeding claims. Thus, the sleeve may have other dimensions than described, it is preferably circular but may have another shape, it may be made of plastic or another suitable material and it can be mounted in other ways than described. In certain, special applications it might be sufficient if the filter device has only one filter hose, but normally it includes several filter cassettes with a larger number of filter hoses and associated sleeves 14. If an end portion of the helical separating thread is provided to surround the end portion 14a, then the filter hose 6 engages and/or surrounds also this end portion.

I claim:

1. Device at a filter hose, forming part of a hose filter, whereby contaminated gases (7) are brought to flow into the filter hose (6) for depositing contaminants (9) on the outer side of the filter hose (6), whereby the gases are brought to flow out of the filter hose (6) to a clean-gas zone (11) through a sleeve (14), whereby at least one compressed-air nozzle (17) is provided in the clean-gas zone (11) at a distance from the sleeve (14) and adapted to guide a blow-like flow (18) of compressed air through the sleeve (14) into the filter hose (6) for momentarily expanding said hose and thereby loosen the contaminants (9) deposited on the outer side of the filter hose (6), and whereby the sleeve (14) has an end portion (14a) defining a compressed-air discharge zone (24) through which the compressed air flows from the sleeve (14) into the filter hose (6), characterized in that the filter hose (6) engages and/or is connected to the end portion (14a) of the sleeve (14), the sleeve (14) has anchoring portions (29) for mounting the filter hose (6) at a filter cassette (4) forming part of the hose filter (3), the sleeve (14), is insertable into apertures (12) in anchoring portions (5) in the filter cassette (4) for clamping the filter hose (6) by means of said sleeve (14).

2. Device according to claim 1, characterized in that the filter hose (6) has a portion (6b) that surrounds and engages the end portion (14a) of the sleeve (14).

3. Device according to claim 1, characterized in that a portion (6c) of the filter hose (6) is clamped by means of the sleeve (14) and that the filter hose (6) extends from said clamped portion (6c) along the sleeve (14) and the end portion (14a) thereof.

4. Device according to claim 1, characterized in that a portion (6d) of the filter hose (6) closest to the end portion (14a) of the sleeve (14) expands in a direction from said end portion (14a).

5. Device according to claim 1, whereby the compressed-air discharge zone (24) of the sleeve (14) expands in a direction towards a compressed-air discharge opening in the end portion (14a) of the sleeve (14), characterized in that the filter hose (6) closest to said end portion (14a) expands as an extension of the compressed-air discharge zone (24).

6. Device according to claim 1, characterized in that the filter hose (6) connects to the end portion (14a) of the sleeve (14) without sharp interruptions.

7. Device according to claim 1, characterized in that the filter hose (6) engages and/or surrounds an end portion of helical separating thread (6a) which end portion surrounds said end portion (14a) of the sleeve (14).

8. Device according to claim 1, characterized in that the portions of the sleeve (14) defining a compressed-air receiving zone (19) are situated on the clean-gas side of those anchoring portions (5) in the filter cassette that are adapted for mounting the filter hose (6) through the sleeve (14).

* * * * *